R. MURPHY & C. W. ATKINSON.

FLUSHING DEVICE FOR URINALS.

No. 11,215. Reissued Dec. 29, 1891.

Attest.
Wilbur Moore
L. E. Layman.

Inventors.
Richard Murphy.
Charles W. Atkinson.
by James H. Layman.
Atty.

UNITED STATES PATENT OFFICE.

RICHARD MURPHY AND CHARLES W. ATKINSON, OF CINCINNATI, OHIO.

FLUSHING DEVICE FOR URINALS.

SPECIFICATION forming part of Reissued Letters Patent No. 11,215, dated December 29, 1891.

Original No. 401,575, dated April 16, 1889. Application for reissue filed March 11, 1891. Serial No. 384,684.

*To all whom it may concern:*

Be it known that we, RICHARD MURPHY and CHARLES W. ATKINSON, both of Cincinnati, in the county of Hamilton and State of Ohio, have invented certain new and useful Improvements in Flushing Devices for Urinals; and we do hereby declare that the following is a full, clear, and exact description of the invention, that will enable others skilled in the art to which it appertains to make and use the same, reference being had to the accompanying drawings, and to the figures of reference marked thereon, which form a part of this specification.

Our invention, although specially designed for urinals, is also applicable to water-closets, and is capable of being operated either automatically or manually.

Our improvements have for their objects, first, to lessen the gurgling noise which occurs ordinarily when the flushing-tank is being emptied; second, to provide means whereby flushing can be accomplished either automatically or at the discretion of the operator; third, provisions which secure various automatic flushing at various intervals.

In order to accomplish the above-stated results, our device is so constructed that the raising of the ball or float by the water will, instead of operating to cut off the water-supply, operate momentarily to admit a larger supply of water, thereby (by means hereinafter described) "siphoning out" the water in bulk, instead of depending on the ordinary overflow, which allows a small portion only of the water to escape.

Figure 1:
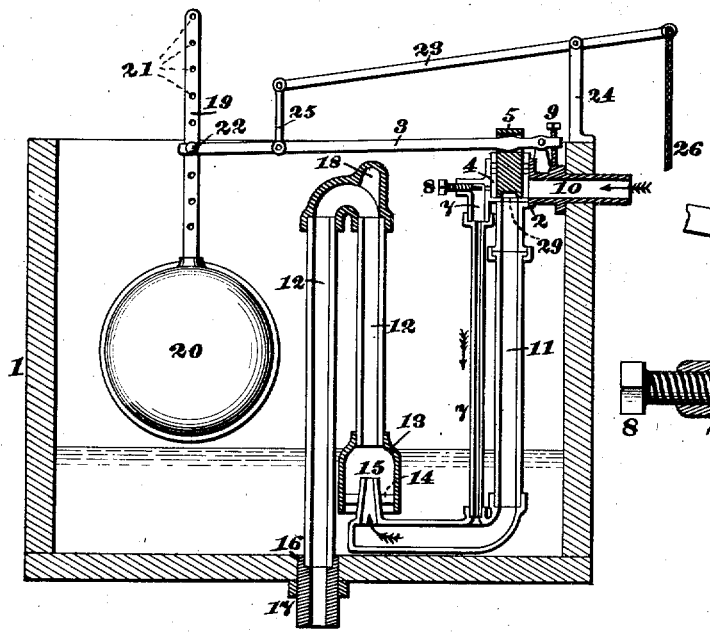
Figure 3:
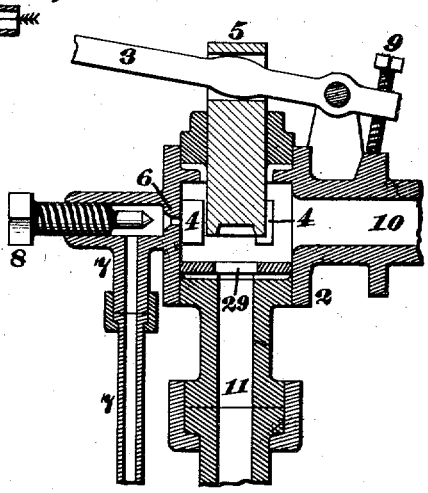
Figure 2:
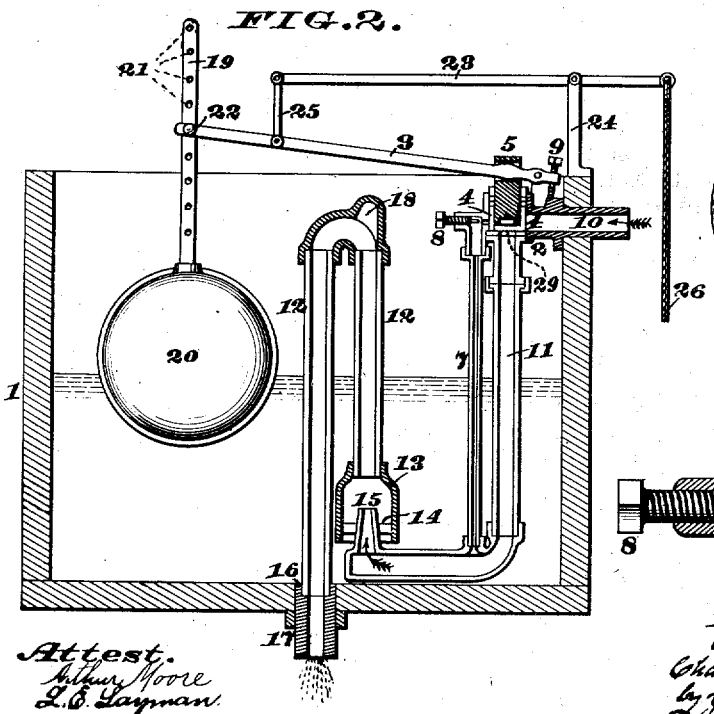
Figure 5:
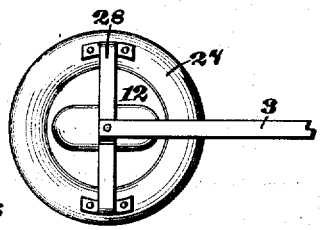
Figure 4:
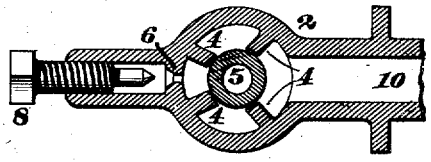

In the accompanying drawings, Figure 1 is a longitudinal vertical section showing the normal or inactive condition of our flushing device. Fig. 2 represents the same in operation. Fig. 3 is an enlarged section of the ball-cock. Fig. 4 is a central horizontal section of the ball-cock. Fig. 5 shows the method of application of an ordinary ring-float to our device.

1 may represent a suitable elevated reservoir or tank, into one side of which is screwed a ball-cock 2.

3 represents a lever of the second class. The ball-cock is provided with lugs 4, which serve to guide the plunger 5, and yet are not so long as to prevent the water from flowing both above and beneath them to the port or opening 6, through which the water escapes to the by-pass 7. A set-screw 8 is capable of being screwed toward or away from the said port 6 to enable discretionary regulation of water-supply to the said by-pass. The lever 3 has upon one end a set-screw 9 for any desired discretional limitation of the sweep of said lever. This provision is, further, for preventing the lever from getting so high as to bind when the water enters from the service-pipe with unusually great force.

The main supply-pipe 11 and the by-pass 7 join near the bottom of the tank. A siphon 12 has upon one end an enlarged mouth-piece 13, whose perforated cross-bar 14 receives and holds the siphon-jet 15 of the main supply-pipe. The object of this enlarged mouth-piece is to compensate for the space taken up by the said siphon-jet. The other end of the siphon passes through the tank-floor, to which it is rigidly secured by plate 16 and washer 17. This end projects slightly beyond the tank-bottom, in order that a flushing-pipe may be connected thereto.

The siphon may be surmounted by a chamber or chambered extension 18 for purposes hereinafter set forth.

The stem 19 of the ball or float 20, is provided with perforations 21. A screw 22 by engaging in the lever and the said stem-perforations, is capable of holding the float to any desired adjustment. A lever 23, which fulcrums at 24, is so connected with the lever 3 by means of the rod 25 that any one may by pulling the chain 26 open the ball-cock, and thus give a force-wash.

In the modification shown in Fig. 5, 27 represents a "ring-float," which surrounds the siphon and is controlled by the lever 3 and the arm 28, which projects sufficiently far above the top of the siphon to prevent it (at the float's lowest position) from colliding with said siphon.

Our above-described flushing device operates as follows: The water entering by the service-pipe passes, as aforesaid, over the lugs or projections 4 (the plunger 5 being caused to press firmly against its seat 29 by the gravitation of the float 20) and through the port or opening 6 into the by-pass 7, down which it flows into the main supply-pipe 11, whence it escapes through the siphon-jet 15. The lower portion of the main supply-pipe is continually "trapped" or filled with water, so that water entering same from the by-pass is thereby prevented from making any noise. Now the ball 20 of course will not float until there is a sufficient amount of water in the tank to buoy up the ball and overcome its weight and that of its attachments and the adhesion of the plunger to its seat. When the water has reached this point, it will force the ball (and consequently the plunger) suddenly upward, which will turn on full pressure from the service-pipe 10 into the main supply-pipe 11. The water thus violently ejected from the supply-jet 15 will partially impinge against the crown of the chambered extension 18, and thence will fall back and pass to the siphon-jet 15 of the siphon, and thus rapidly fill the same, while the remaining water will be deflected by the arched crown of the U-coupling into the other limb of the siphon, from which it will expel the air and will consequently cause immediate siphoning of the water out of the tank until the siphon begins to "draw air" from the water sinking below the level at which it buoys the float, which latter has of course in the meantime descended, thereby reseating the plunger in readiness for a repetition of the above-described movements.

The enlarged mouth-piece not only holds and guides the siphon-jet, but causes a partial cessation of the siphoning before the water falls as low as the entrance of said mouth-piece, which partial stoppage is effected by the orifice 13. This orifice allows a small amount of air to enter the siphon; but the very instant the water falls to the level of the mouth-piece a large area is exposed to the air, the result being an immediate stoppage of the flow unaccompanied with the disagreeable hissing or singing noise incidental to air and water being both sucked at the same time through a contracted passage.

By adjusting the float upon its lever and the set-screw 8 to or from the port 6 no less than four different kinds of flushes or washes may be obtained. Thus, first, by nearly closing the port with the set-screw and by setting the float at a point within near proximity to the tank-floor slight washes at long intervals (of an hour or more) may be obtained; second, or by keeping the float at the same adjustment and such adjustment of the set-screw as to allow more water to enter the by-pass small washes at short intervals (at any periods less than an hour) may be obtained; third, by nearly closing the port and setting the float at a lower perforation in the stem larger washes may be obtained at longer intervals; fourth and lastly, by opening the port and setting the float to a considerable elevation in the tank very copious washes at very short intervals may be obtained.

By completely closing the port with the set-screw the flushing mechanism can be for the time being rendered inoperative.

The chambered extension 18 operates to receive the "spurt" from the siphon-jet when there is a very copious flow through the port, and in this way prevents water from being deflected around the curved wall of the U-shaped coupling into the long leg of the siphon.

A great practical advantage of the above-described arrangement, especially with turbid or muddy water, is that the port or opening 6 and the by-pass 7 are frequently scoured or cleaned by the sudden rush of water through them consequent on the sudden closure of the ball-cock.

We claim as our invention—

1. In a flushing device for urinals, the combination of the automatic and the manual means for discharging water from the tank, consisting, substantially, of the following elements, to wit: a ball-cock 2, having a plunger 5, which is guided by lugs 4, and port 6, which operates at regulatable intervals of time to admit for a short space of time a spurt of water through main supply-pipe 11 into the siphon 12, for the purpose specified, a lever 23 for manual operations of said ball-cock, a siphon 12, the siphon-jet 15, a by-pass 7, through which passes the normal supply, and set-screw 8 for controlling the flow into said by-pass, and a stem 19, provided with perforations 21, as and for the purposes set forth.

2. In a flushing device for urinals, water-closets, &c., a siphon having its longer arm passing through and secured to the tank-floor and having upon the shorter arm an enlarged mouth-piece, which is provided at its upper end with a small orifice for the purposes set forth, said enlarged mouth-piece also carrying a perforated cross-bar, which receives the siphon-jet of the main supply-pipe, and a chambered projection in the U-shaped coupling for receiving jets of water from the siphon-jet, as and for the purpose set forth.

3. In a flushing device for urinals, water-closets, &c., a tank, a siphon secured therein and having its mouth near the bottom of said tank, a service-pipe terminating with a jet-nozzle inserted within the siphon's mouth, which nozzle is the sole water-inlet for the flushing device, a cut-off that controls the flow through said pipe and nozzle, and a lever and float that automatically operate said cut-off, substantially as described.

4. In a flushing device for urinals, water-closets, &c., a tank, a siphon secured therein and having its mouth near the bottom of said tank, a service-pipe terminating with a jet-nozzle inserted within the siphon's mouth, which nozzle is the sole water-inlet for the flushing device, a by-pass communicating at its receiving end with said service-pipe and having a graduated port, a cut-off that controls the flow through said pipe and nozzle and allows water to enter said by-pass, and a lever and float that automatically operate said cut-off, substantially as herein described.

5. In a flushing device for urinals, water-closets, &c., a tank, a siphon secured therein and having its mouth near the bottom of said tank, a service-pipe terminating with a jet-nozzle inserted within the siphon's mouth, which nozzle is the sole water-inlet for the flushing device, a by-pass communicating both at its receiving and discharging ends with said service-pipe and having a graduated port, a cut-off that controls the flow through said pipe and nozzle and allows water to enter said by-pass, and a lever and float that automatically operate said cut-off, substantially as herein described.

6. In a flushing device for urinals, water-closets, &c., a tank, a siphon secured therein and having its mouth near the bottom of said tank, a jet-nozzle inserted within the siphon's mouth, and a chambered extension 18 in the bend, uniting the two legs of said siphon, for the purpose herein described.

7. In a flushing device for urinals, water-closets, &c., a tank, a service-pipe discharging into the same, a cut-off applied to said service-pipe, and a lever that operates said cut-off, which lever has a vertically-adjustable float at one end, a regulating-screw at its opposite end, and a fulcrum-bearing between said cut-off and screw, for the purpose herein described.

8. In a flushing device for urinals, water-closets, &c., a tank, a siphon secured therein and having its mouth near the bottom of said tank, a jet-nozzle inserted within the siphon's mouth, which nozzle is the sole water-inlet for the flushing device and is applied to the discharging end of a vertical service-pipe, the receiving end of the latter being provided with a reciprocating cut-off operated by a lever coupled to a float, substantially as herein described.

9. In a flushing device for urinals, water-closets, &c., a tank, a siphon secured therein and having its mouth near the bottom of said tank, a service-pipe terminating with a jet-nozzle inserted within the siphon's mouth, which nozzle is the sole water-inlet for the flushing device, a cut-off applied to said service-pipe, a lever coupled to said cut-off, and a float that operates said lever, whereby the opening and closing of said cut-off is automatically controlled by the rising and falling of the water in said tank, substantially as herein described.

10. In a flushing device for urinals, water-closets, &c., a tank, a siphon secured therein and having its mouth near the bottom of said tank, a service-pipe terminating with a jet-nozzle inserted within the siphon's mouth, which nozzle is the sole water-inlet for the flushing device, and an automatically-operated cut-off applied to said service-pipe, substantially as herein described, and for the purpose stated.

In testimony whereof we affix our signatures in presence of two witnesses.

RICHARD MURPHY.
CHARLES W. ATKINSON.

Witnesses:
JAMES H. LAYMAN,
SAMUEL M. QUINN.